United States Patent
Sato et al.

(10) Patent No.: US 10,216,326 B2
(45) Date of Patent: Feb. 26, 2019

(54) PORTABLE APPARATUS

(71) Applicant: Minebea Mitsumi Inc., Nagano (JP)

(72) Inventors: Satoshi Sato, Kitasaku (JP); Naoyuki Terada, Iwata (JP); Kazumasa Adachi, Hamamatsu (JP); Makoto Furuta, Fukuroi (JP); Takahiro Shimura, Hamamatsu (JP); Shigeyuki Adachi, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/025,394

(22) Filed: Jul. 2, 2018

(65) Prior Publication Data

US 2018/0321789 A1 Nov. 8, 2018

Related U.S. Application Data

(63) Continuation of application No. 15/381,897, filed on Dec. 16, 2016, now Pat. No. 10,114,506.

(30) Foreign Application Priority Data

Dec. 22, 2015 (JP) .................................. 2015-250471

(51) Int. Cl.
*G06F 3/041* (2006.01)
*G06F 1/16* (2006.01)

(52) U.S. Cl.
CPC .......... *G06F 3/0416* (2013.01); *G06F 1/1613* (2013.01); *G06F 1/1643* (2013.01); *G06F 3/0412* (2013.01); *G06F 3/0414* (2013.01); *G06F 2203/04105* (2013.01)

(58) Field of Classification Search
CPC ...... G06F 1/1613–1/1698; G06F 3/041–3/047
See application file for complete search history.

(56) References Cited

U.S. PATENT DOCUMENTS

| 5,241,308 | A | 8/1993 | Young | |
|---|---|---|---|---|
| 5,708,460 | A | 1/1998 | Young | |
| 9,167,059 | B2 * | 10/2015 | Kim | H04M 1/0202 |
| 2008/0165159 | A1 * | 7/2008 | Soss | G06F 3/0414 345/174 |

(Continued)

FOREIGN PATENT DOCUMENTS

JP 2006-126997 A 5/2006

OTHER PUBLICATIONS

Office action in parent U.S. Appl. No. 15/381,897, dated Jan. 4, 2018.

*Primary Examiner* — Gene W Lee
(74) *Attorney, Agent, or Firm* — Pearne & Gordon LLP (57) ABSTRACT

There is provided a portable apparatus capable of detecting a touch position where a user touches the portable apparatus and a touch strength with which the user touches the portable apparatus. The portable apparatus includes: a rectangular frame on which a display panel unit is to be mounted; four touch detection-dedicated legs respectively extending from vicinities of four corners of the frame; a first strain gage attached to each of the touch detection-dedicated legs; and a calculation unit that finds the touch position and the touch strength based on an output of the first strain gage.

4 Claims, 7 Drawing Sheets

(56) References Cited

U.S. PATENT DOCUMENTS

| | | | |
|---|---|---|---|
| 2015/0248235 A1* | 9/2015 | Offenberg | G06F 3/04886 715/773 |
| 2016/0041672 A1* | 2/2016 | Hoen | G06F 3/041 345/173 |
| 2016/0070338 A1 | 3/2016 | Kim | |

* cited by examiner

PORTABLE APPARATUS

CROSS REFERENCE TO RELATED APPLICATION

The present application claims priority from U.S. application Ser. No. 15/381,897 filed on Dec. 16, 2016 and Japanese Patent Application No. 2015-250471, filed on Dec. 22, 2015, and titled "PORTABLE APPARATUS", the disclosures of which is incorporated herein by reference in its entirety.

BACKGROUND

The present disclosure relates to a portable apparatus that includes a strain gage.

As portable apparatuses that include a touch panel, smart phones, for example, are widely used. In these portable apparatuses, touch panels of various systems, such as a resistance film system or an electrostatic capacity (capacitance) system, are employed.

Moreover, although not used in portable apparatuses, a three-dimensional touch panel in which pressure sensors are disposed at four corners of the panel and a pressed-down position of a screen and a pressing-down pressure are detected based on output values from the pressure sensors, has also been proposed (Japanese Patent Application Laid-Open No. 2006-126997).

SUMMARY

In a conventional portable apparatus that includes a touch panel of the likes of the resistance film system, when a user applies a pressing force to a display panel, this pressing force cannot be detected.

Although the three-dimensional touch panel described in Japanese Patent Application Laid-Open No. 2006-126997 can detect the pressing force applied to the display panel, a more appropriate input method has become required in portable apparatuses.

An object of the present disclosure is to provide a novel portable apparatus that can detect a pressing force applied by a user, by a simple configuration.

According to a first aspect of the present disclosure, there is provided a portable apparatus capable of detecting a touch position where a user touches the portable apparatus and a touch strength with which the user touches the portable apparatus, the portable apparatus including:

a rectangular frame on which a display panel unit is to be mounted;

four touch detection-dedicated legs respectively extending from vicinities of four corners of the frame;

a first strain gage attached to each of the touch detection-dedicated legs; and a calculation unit that finds the touch position and the touch strength based on an output of the first strain gage.

According to a second aspect of the present disclosure, there is provided a portable apparatus capable of detecting a grip strength with which a user grips the portable apparatus, the portable apparatus including:

a rectangular frame on which a display panel unit is to be mounted;

a first grip detection-dedicated leg extending from a long side of the frame;

a first strain gage attached to the first grip detection-dedicated leg; and a calculation unit that finds the grip strength based on an output of the first strain gage.

According to a third aspect of the present disclosure, there is provided a portable apparatus capable of detecting a touch position where a user touches the portable apparatus and a touch strength with which the user touches the portable apparatus, the portable apparatus including:

a frame on which a display panel unit is to be mounted;

at least two touch detection-dedicated legs respectively extending from the frame;

a first strain gage attached to each of the touch detection-dedicated legs; and a calculation unit that finds the touch position and the touch strength based on an output of the first strain gage.

EMBODIMENTS

First Embodiment

A portable telephone (mobile phone) 100 of a first embodiment of the present disclosure will be described with reference to FIGS. 1 to 5. The portable telephone 100 is an example of a portable apparatus of the present disclosure.

Figure 1:
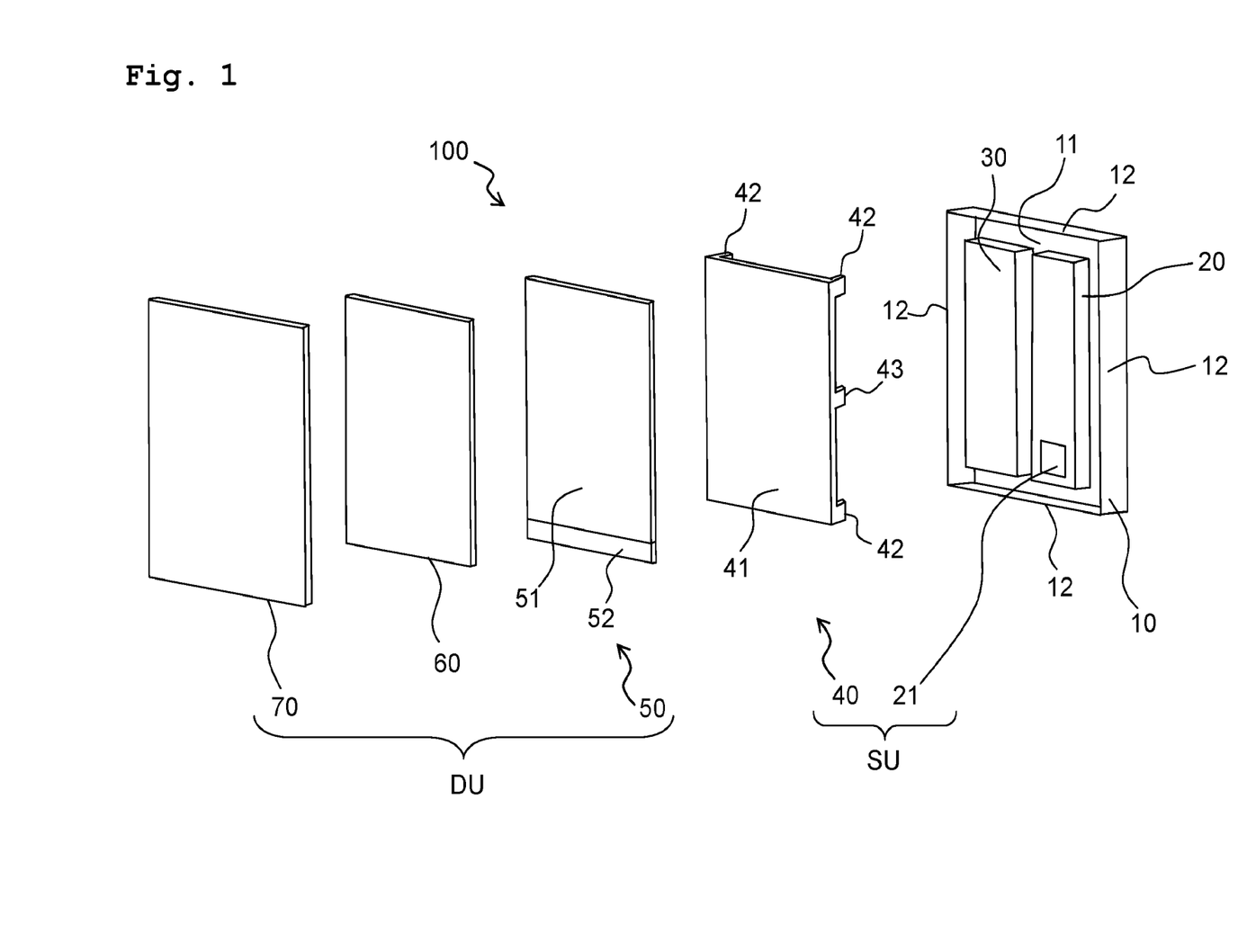
FIG. 1 is an exploded perspective view of a portable telephone of an embodiment of the present disclosure.

The portable telephone 100 of the first embodiment mainly includes: a casing 10; a control unit 20 and power supply 30 that are housed in the casing 10; a detection member 40 covering the control unit 20 and power supply 30; and a display panel unit DU attached to the detection member 40. The display panel unit DU has a structure in which a backlight 50, a liquid crystal panel 60, and a transparent cover 70 are overlaid in this order.

In the description below, a direction in which the casing 10, the detection member 40, and the display panel unit DU are overlaid will be called a front-rear direction of the portable telephone 100, a side where the transparent cover 70 is positioned will be called a front, and a side where the casing 10 is positioned will be called a rear.

The casing 10 includes: a rectangular shaped back plate (back surface) 11; and four side plates (side surfaces) 12 each of which is upright frontwards from each of the four sides of the back plate 11. Undepicted power supply switch for turning on the portable telephone 100, undepicted microphone for performing speech communication using the portable telephone 100, and so on, are disposed on the side plate 12.

The control unit 20 is an integrated circuit housed in the casing 10, and includes a CPU unit (not depicted), a storage unit (not depicted), a communication control unit (not depicted), a sensor calculation unit 21 (calculation unit), and so on.

The power supply 30 is a secondary battery for supplying electric power to the control unit 20, the backlight 50, the liquid crystal panel 60, and so on, and, as an example, may be configured as a lithium ion battery. The power supply 30 is housed adjacently to the control unit 20 on the inside of the casing 10.

Figure 2:
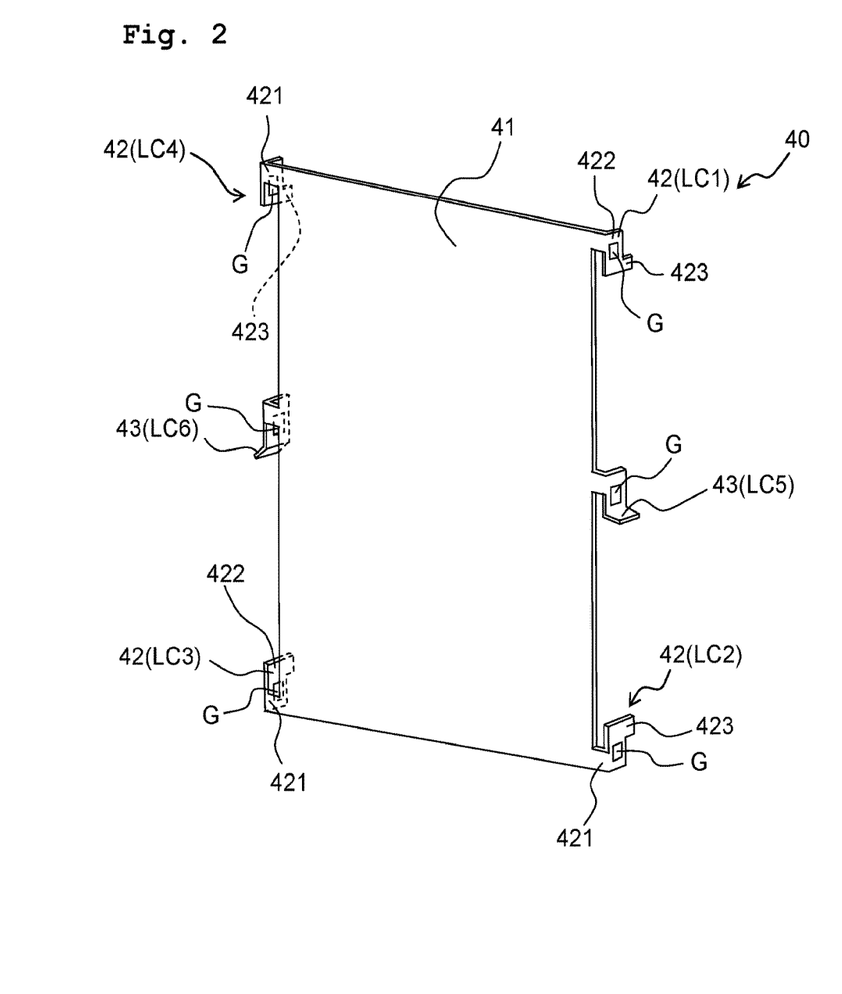
FIG. 2 is a perspective view of a detection member included in the portable telephone of the embodiment of the present disclosure.

As depicted in FIG. 2, the detection member 40 includes: a frame 41 which is a rectangular shaped flat plate; four touch detection-dedicated legs 42 respectively provided in four corner sections of the frame 41; and two grip detection-dedicated legs 43 respectively provided on a pair of long sides of the frame 41. The detection member 40 is housed on the inside of the casing 10 in a state where the four touch detection-dedicated legs 42 are in contact with the back plate 11 of the casing 10 and the two grip detection-dedicated legs 43 are in contact with the side plates 12 of the casing 10. The frame 41 is disposed frontwards of the control unit 20 and the power supply 30 so as to cover these.

A sensor unit SU is configured by the sensor calculation unit 21 of the control unit 20 and the detection member 40. Detailed structure and operation of the detection member 40 and the sensor unit SU will be described later.

The backlight 50 of the display panel unit DU is attached, by the likes of a double-sided tape or an adhesive agent, to a front surface of the frame 41 of the detection member 40. The backlight 50 includes: a rectangular shaped light-guiding plate 51; and a light source unit 52 provided along a short side of the light-guiding plate 51. A plurality of convexities (not depicted) are formed on a rear surface of the light-guiding plate 51. The plurality of convexities are each a projection of substantially hemispherical shape projecting outwardly (rearwards) from the light-guiding plate 51, and are disposed over an entire region of the rear surface of the light-guiding plate 51. Light emitted from the light source unit 52 is reflected frontwards by the plurality of convexities, and is emitted toward the liquid crystal panel 60 from a front surface of the light-guiding plate 51.

The liquid crystal panel 60 of the display panel unit DU has a structure in which a polarizing filter, a color filter substrate, a liquid crystal layer, an array substrate, and so on, none of which is depicted, are stacked. The liquid crystal panel 60 modulates light from the backlight 50 to form an image.

The transparent cover 70 of the display panel unit DU is a member that covers an opening of the casing 10 thereby closing the opening, and protects the liquid crystal panel 60, and so on, and, as an example, is a rectangular plate of glass or a transparent resin.

Next, the sensor unit SU included in the portable telephone 100 of the first embodiment will be described with reference to FIGS. 2 to 5.

The frame 41 of the detection member 40 of the sensor unit SU is a rectangular flat plate as depicted in FIG. 2, and, as an example, may be formed by SUS, or the like.

Figure 3:
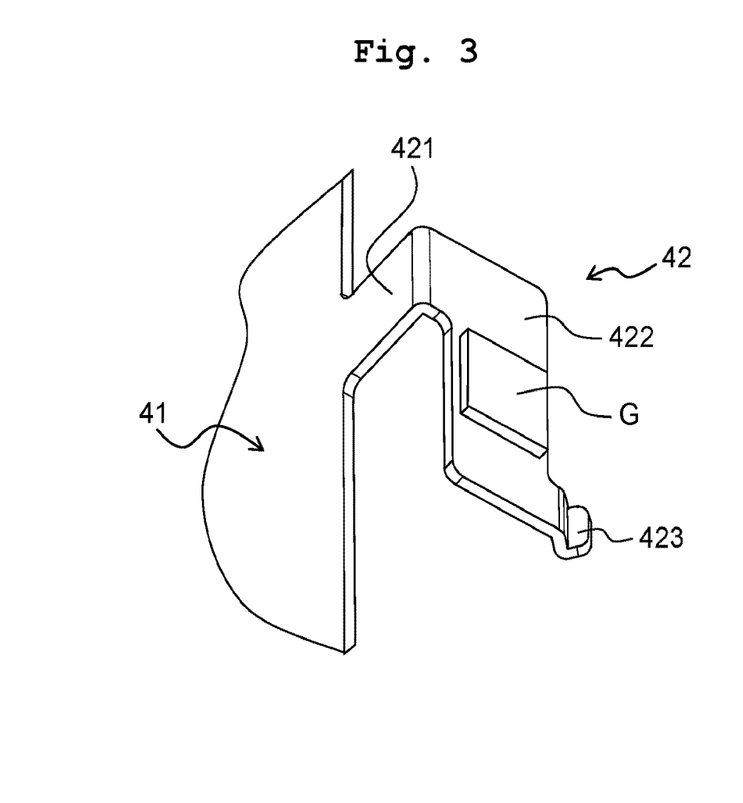
FIG. 3 is a perspective view of a touch detection-dedicated leg included in the detection member.

As depicted in FIG. 3, the touch detection-dedicated legs 42 provided in the four corners of the frame 41 are each a member made by bending and shaping a portion projecting from the frame 41, and each include a first plate 421, a second plate 422, and a third plate 423.

The first plate 421 is a substantially square flat plate that connects the frame 41 and the second plate 422. The first plate 421 projects laterally from a long side of the frame 41, and extends on an identical plane to the frame 41.

The second plate 422 is a rectangular flat plate for attaching (installing) a strain gage G, a long side direction of the second plate 422 is equivalent to a long side direction of the frame 41, and a short side direction of the second plate 422 is equivalent to the front-rear direction orthogonal to the frame 41. Therefore, the second plate 422 is positioned in a plane orthogonal to the frame 41 and extending in the long side direction of the frame 41.

The second plate 422 is connected to a tip of the first plate 421 at a front side of one end in the long side direction of the second plate 422. Moreover, the third plate 423 is connected to a rear side of the other end in the long side direction of the second plate 422.

In the two touch detection-dedicated legs 42 depicted on the upper side in FIGS. 1 and 2, of the four touch detection-dedicated legs 42, the second plate 422 is connected to the tip of the first plate 421 at a front side of an upward end in the long side direction of the second plate 422, and is connected to the third plate 423 at a rear side of a downward end in the long side direction of the second plate 422. Contrarily, in the two touch detection-dedicated legs 42 depicted on the lower side in FIGS. 1 and 2, the second plate 422 is connected to the tip of the first plate 421 at a front side of the downward end in the long side direction of the second plate 422, and is connected to the third plate 423 at a rear side of the upward end in the long side direction of the second plate 422. In other words, the four touch detection-dedicated legs 42 are each provided such that, in the long side direction of the frame 41, the first plate 421 is positioned on an end side and the third plate 423 is positioned on a center side. As a result, two positions, on one long side of the frame 41, where two touch detection-dedicated legs 42 are attached to the long side, can be largely separated, and consequently it becomes possible for detection of a later-described touch position to be performed in a broader range.

The strain gage G (first strain gage) is attached to each surface of the second plate 422, each strain gage G being attached to a vicinity of a center in the long side direction of each surface (more specifically, a place where shearing stress concentration occurs due to touch). The strain gages G are each connected to the sensor calculation unit 21 of the control unit 20 by an undepicted wiring line. Due to a half-bridge configuration using these two strain gages G, a strain (later-described shearing strain) occurring in the second plate 422 can be detected with about twice a sensitivity compared to when one strain gage is used.

As depicted in FIG. 3, the third plate 423 has substantially an L shape made by bending a flat plate extending rearwards from the second plate 422 such that a center in the front-rear direction of the flat plate projects to a frame 41 side. A rear end of the third plate 423 is in contact with an inner surface side of the back plate 11 of the casing 10.

In each of the four touch detection-dedicated legs 42, when the frame 41 is applied with a load from the front, the first plate 421 moves rearwards in a state of the third plate 423 is in contact with the casing 10, hence a shearing strain occurs within the second plate 422. The sensor calculation unit 21 detects a magnitude (size) of the shearing strain that has occurred within the second plate 422 via the strain gage G attached to the second plate 422, and a magnitude of the load applied to each of the four touch detection-dedicated legs 42 can be found based on a magnitude of this shearing strain. That is, four load sensors are configured by each of the four touch detection-dedicated legs 42 and the sensor calculation unit 21.

Hereafter, for convenience of explanation, a load sensor configured by the touch detection-dedicated leg 42 provided at top right when viewing the frame 41 in FIG. 2 from the front, and the sensor calculation unit 21, will be called a load sensor LC1, and load sensors configured by the touch detection-dedicated legs 42 provided at bottom right, bottom left, and top left when viewing the frame 41 in FIG. 2 from the front, and the sensor calculation unit 21, will be called, respectively, load sensors LC2, LC3, and LC4.

Figure 4:
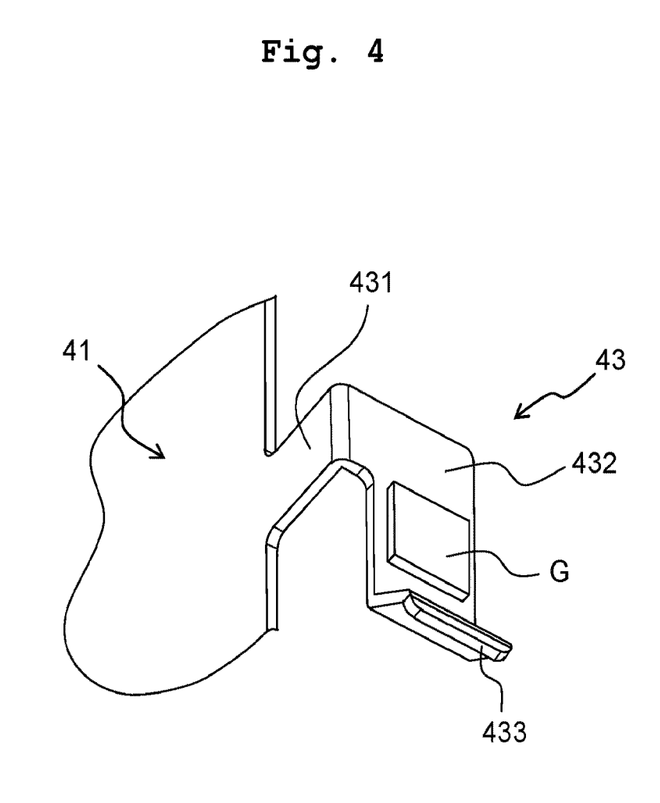
FIG. 4 is a perspective view of a grip detection-dedicated leg included in the detection member.

As depicted in FIG. 4, the grip detection-dedicated legs 43 provided in vicinities of the centers of the long sides of the frame 41 are each a member made by bending and shaping (forming) a portion projecting from the frame 41, and each include a first plate 431, a second plate 432, and a third plate 433.

The first plate 431 is a substantially square flat plate that connects the frame 41 and the second plate 432. The first plate 431 projects laterally from the long side of the frame 41, and extends on an identical plane to the frame 41.

The second plate 432 is a rectangular flat plate to which the strain gage G is attached, a long side direction of the second plate 432 is equivalent to the long side direction of the frame 41, and a short side direction of the second plate 432 is equivalent to the front-rear direction orthogonal to the frame 41. Therefore, the second plate 432 is positioned in a plane orthogonal to the frame 41 and extending in the long side direction of the frame 41. Moreover, the second plate 432 is positioned on an identical plane to the second plate 422 of the touch detection-dedicated leg 42.

The second plate 432 is connected to a tip of the first plate 431 at a front side of one end in the long side direction of the second plate 432. Moreover, the third plate 433 is connected to the other end in the long side direction of the second plate 432.

The strain gage G (first strain gage or second strain gage) is attached to each surface of the second plate 432, each strain gage G being attached to a vicinity of a center in the long side direction of the second plate 432 (more specifically, a place where shearing stress due to grip occurs). The strain gages G are each connected to the sensor calculation unit 21 of the control unit 20 by an undepicted wiring line. Due to a half-bridge configuration using these two strain gages G, a strain (later-described bending strain) occurring in the second plate 432 can be detected with about twice a sensitivity compared to when one strain gage is used.

As depicted in FIG. 4, the third plate 433 has substantially an L shape made by combining two plate sections that extend orthogonally to the frame 41 and having certain angles with respect to the second plate 432. An end on an opposite side to the end connected to the second plate 432, of the third plate 433 is in contact with an inner surface side of the side plate 12 of the casing 10.

In each of the two grip detection-dedicated legs 43, when the side plate 12 of the casing 10 is applied with a load from the side and flexure occurs in the side plate 12, the third plate 433 moves toward the frame 41 in a state that the first plate 431 is in contact with the frame 41, and a bending strain occurs within the second plate 432. The sensor calculation unit 21 detects a magnitude of the bending strain that has occurred within the second plate 432 via the strain gage G attached to the second plate 432, and a magnitude of the load applied to each of the two grip detection-dedicated legs 43 can be found based on a magnitude of this bending strain. That is, two load sensors are configured by each of the two grip detection-dedicated legs 43 and the sensor calculation unit 21.

Hereafter, for convenience of explanation, a load sensor configured by the grip detection-dedicated leg 43 provided on a right side of the frame 41 when viewing the frame 41 in FIG. 2 from the front side, and the sensor calculation unit 21, will be defined as a load sensor LC5, and a load sensor configured by the grip detection-dedicated leg 43 provided on a left side of the frame 41 when viewing the frame 41 in FIG. 2 from the front side, and the sensor calculation unit 21, will be defined as a load sensor LC6.

The first plate 421, the second plate 422, and the third plate 423 of the touch detection-dedicated leg 42, and the first plate 431, the second plate 432, and the third plate 433 of the grip detection-dedicated leg 43 are each preferably formed integrally by the same material as the frame 41. Due to the above configuration, fixing strength of the frame 41 and the touch detection-dedicated leg 42 and fixing strength of the frame 41 and the grip detection-dedicated leg 43 can be more secured, and irregular deformation of a connecting section can be more reduced, compared to a configuration where, for example, the first plate 421, the second plate 422, and the third plate 423 of the touch detection-dedicated leg 42, and the first plate 431, the second plate 432, and the third plate 433 of the grip detection-dedicated leg 43 are formed by a different material from the frame 41, the touch detection-dedicated leg 42 and the grip detection-dedicating leg 43 is fixed to the frame 41 by welding, or the like. Therefore, due to the above configuration, highly precise load detection becomes possible.

As an example, the detection member 40 may be held in the casing 10 in a state of being slightly biased rearwards by the display panel unit DU. In this state, the detection member 40 is held in a fixed position by frictional resistance between a tip end of the third plate 423 of the touch detection-dedicated leg 42 and an inside surface of the back plate 11 of the casing 10.

Next, an operation for detecting a touch position and a touch strength, using the sensor unit SU of the present embodiment, will be described.

In a broad sense, "touch position" in the present specification means a position that a user of the portable apparatus (in the present embodiment, the portable telephone 100) touches the portable apparatus, and, specifically, it means, for example, a position that the user touches a monitor screen of the portable apparatus. "Touch position" in the present embodiment is a position that the user touches the transparent cover 70 of the portable telephone 100, and is a position that a load occurring due to the user touching the transparent cover 70 of the portable telephone 100 is applied to the frame 41 as well.

Moreover, in a broad sense, "touch strength" in the present specification means a strength with which the user of the portable apparatus (in the present embodiment, the portable telephone 100) touches the portable apparatus, and, specifically, it means, for example, a strength with which the user presses the monitor screen of the portable apparatus. "Touch strength" in the present embodiment is a strength with which the user presses the transparent cover 70 of the portable telephone 100, and is a magnitude of a load applied to the frame 41 due to the user pressing the transparent cover 70 of the portable telephone 100 as well.

In the portable telephone 100 of the present embodiment, when the user touches the transparent cover 70 from the front, a pressing force with which a finger of the user pushes the transparent cover 70 rearwards is transmitted to the frame 41 of the detection member 40, via the liquid crystal panel 60 and the backlight 50, and a load is applied to the frame 41.

Figure 5:
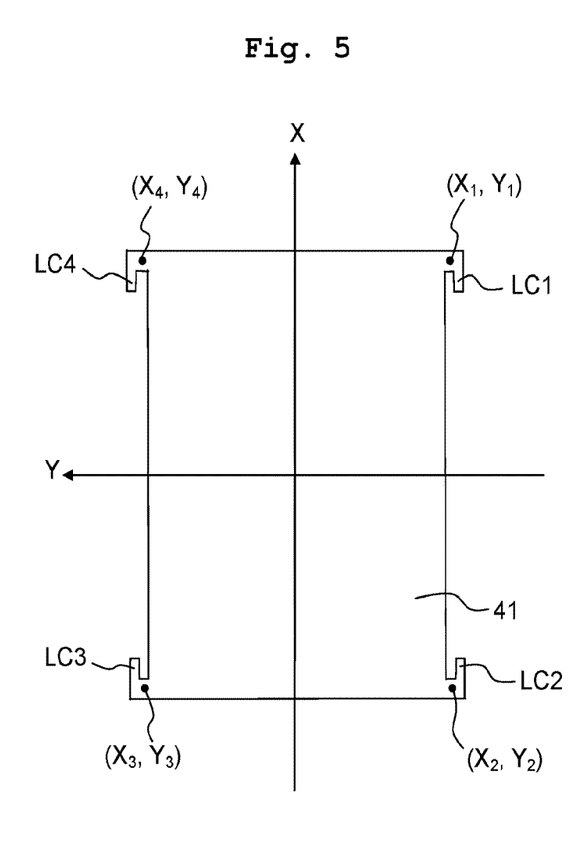
FIG. 5 is an explanatory view for explaining a method of calculating a touch position and a touch strength.

Now, a position that the load on the frame 41 is applied and a magnitude of the applied load can be found using the load sensors LC1 to LC4. Specifically, for example, as depicted in FIG. 5, when the frame 41 is viewed from the front, a long side direction (up-down direction) is defined as an X axis direction, and a short side direction (left-right direction) is defined as a Y axis direction. At this time, if coordinates of the load sensors LC1, LC2, LC3, and LC4 are respectively defined as $(X_1, Y_1)$, $(X_2, Y_2)$, $(X_3, Y_3)$, and $(X_4, Y_4)$, and detection values of loads of the load sensors LC1, LC2, LC3, and LC4 are respectively defined as $W_1$, $W_2$, $W_3$, and $W_4$, then the sensor calculation unit 21 calculates a gravity center position (X, Y), that is, a position that the load is being applied (touch position) on the frame 41 by the following equations.

[Mathematical Expression 1]

$$X = \frac{X_1 \times W_1 + X_2 \times W_2 + X_3 \times W_3 + X_4 \times W_4}{W_1 + W_2 + W_3 + W_4} \quad \text{(Equation 1)}$$

[Mathematical Expression 2]

$$Y = \frac{Y_1 \times W_1 + Y_2 \times W_2 + Y_3 \times W_3 + Y_4 \times W_4}{W_1 + W_2 + W_3 + W_4} \quad \text{(Equation 2)}$$

In addition, the sensor calculation unit 21 calculates a strength W of the load applied to the frame 41, that is, the touch strength, by the following equation.

[Mathematical Expression 3]

$$W = W_1 + W_2 + W_3 + W_4 \quad \text{(Equation 3)}$$

Note that in the present embodiment, the third plates 433 of the grip detection-dedicated legs 43 are in contact with the side plates 12 of the casing 10 in a state where the third plates 433 are slidable in the front-rear direction with respect to the side plates 12 of the casing 10. Therefore, when a load is applied to the frame 41 from the front and the frame 41 moves rearwards, the grip detection-dedicated legs 43 move freely by causing the third plates 433 to slide over an inner surfaces of the side plates 12 of the casing 10. Hence, when a load is applied to the frame 41 from the front, the load sensors LC5 and LC6 are not involved in detection of the load, detection of the load is performed by only the load sensors LC1 to LC4, and the sensor calculation unit 21 can find the touch position and the touch strength using (Equation 1), (Equation 2), and (Equation 3).

Next, an operation for detecting a grip strength, using the sensor unit SU of the present embodiment, will be described.

In the present specification, in a broad sense, "grip strength" means a strength with which the user of the portable apparatus (in the present embodiment, the portable telephone 100) grips the portable apparatus, and, specifically, it means, for example, a strength with which the user grips the casing of the portable apparatus. In the present embodiment, "grip strength" is a strength with which the user grips the side plate 12 of the casing 10 of the portable telephone 100 thereby pressing the side plate 12 toward the inside, and is a magnitude of a load applied to the side plate 12 by the user.

Therefore, in the portable telephone 100 of the present embodiment, a magnitude of a load detected by the load sensors LC5 and LC6 is, in other words, the grip strength. Note that a sum of a detection value of the load sensor LC5 and a detection value of the load sensor LC6 may be defined as the "grip strength", or the detection value of the load sensor LC5 and the detection value of the load sensor LC6 may each be treated as separate "grip strengths", and, for example, one may be defined as a right side grip strength, and the other as a left side grip strength.

Effects of the portable telephone 100 of the present embodiment will be listed below.

The portable telephone 100 of the present embodiment can detect touch position, touch strength, and grip strength, simply by having the detection member 40 disposed on the inside of the casing 10 and building (constructing) the sensor calculation unit 21 in the control unit 20. Therefore, the portable telephone 100 of the present embodiment can perform various detections by a simple configuration. Based on such various detections, the portable apparatus can give a novel operational feeling to a user.

The frame 41 included in the detection member 40 of the portable telephone 100 is a member generally included in a conventional portable telephone. Therefore, it could also be said that the portable telephone 100 of the present embodiment enables detection of touch position, touch strength, and grip strength, simply by providing a conventional portable telephone with the four touch detection-dedicated legs 42 and the two grip detection-dedicated legs 43 each of which is a minute member and is capable of being disposed in dead space within the portable telephone. That is, the portable telephone 100 of the present embodiment can give an original operational feeling to the portable apparatus while suppressing increase in the number of components or complication of a device.

The portable telephone 100 of the present embodiment can perform detection of touch position and touch strength by the sensor unit SU that includes the detection member 40 and the sensor calculation unit 21. Therefore, there is no need to utilize a touch panel of a resistance film system or an electrostatic capacity system, and thinning of the portable telephone can be achieved.

Because the portable telephone 100 of the present embodiment includes the six load sensors LC1 to LC6, it can detect touch position, touch strength, and grip strength accurately, and in particular, can detect touch strength and grip strength with high precision.

Second Embodiment

A portable telephone 200 of a second embodiment of the present disclosure will be described with reference to FIGS. 6 and 7.

Figure 6:
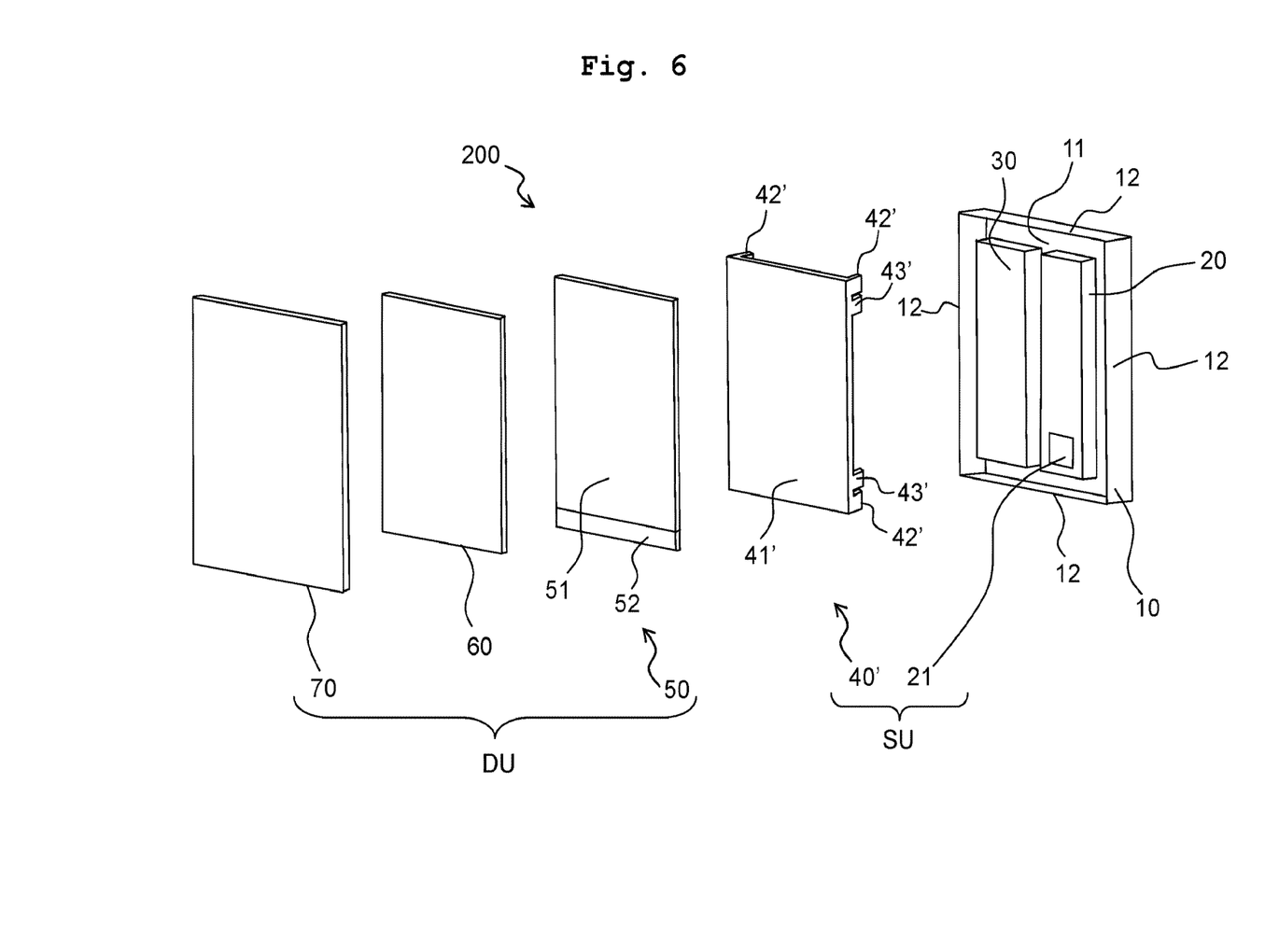
FIG. 6 is an exploded perspective view of a portable telephone of another embodiment of the present disclosure.

As depicted in FIG. 6, the portable telephone 200 of the second embodiment is identical to the portable telephone 100 of the first embodiment, except that a shape of a detection member 40' of the portable telephone 200 of the second embodiment is different from that of the detection member 40 of the portable telephone 100 of the first embodiment. Hereafter, only a configuration of the detection member 40' and detection of a grip position enabled by inclusion of the detection member 40', will be described. Structures and functions not described are identical to those of the portable telephone 100 of the first embodiment.

Figure 7:
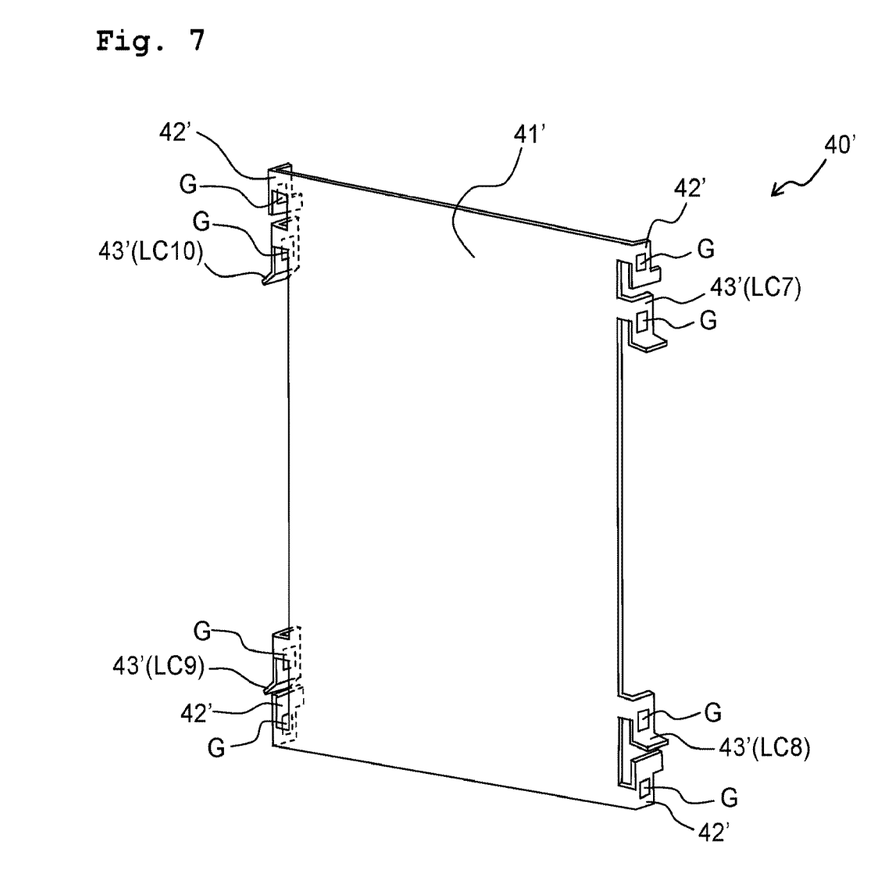
FIG. 7 is a perspective view of a detection member included in the portable telephone of the other embodiment of the present disclosure.

As depicted in FIG. 7, the detection member 40' includes: a frame 41' which is a rectangular shaped flat plate; four touch detection-dedicated legs 42' respectively provided in four corner sections of the frame 41'; and four grip detection-dedicated legs 43' respectively provided adjacently to the four touch detection-dedicated legs 42'. Shapes of the frame 41', the touch detection-dedicated leg 42', and the grip detection-dedicated leg 43' are identical to, respectively, those of the frame 41, the touch detection-dedicated leg 42, and the grip detection-dedicated leg 43 of the first embodiment.

The detection member 40' is housed on the inside of the casing 10 in a state where the four touch detection-dedicated legs 42' is in contact with the back plate 11 of the casing 10 and the four grip detection-dedicated legs 43' is in contact with the side plate 12 of the casing 10 slidably in the front-rear direction. The frame 41' is disposed frontwards of the control unit 20 and the power supply 30 so as to cover these.

The strain gages G attached to each of the four grip detection-dedicated legs 43' are connected to the sensor calculation unit 21 by an undepicted wiring line. Hereafter, a load sensor configured by the grip detection-dedicated leg 43' provided at top right when viewing the frame 41' in FIG. 7 from the front, and the sensor calculation unit 21, will be called a load sensor LC7. Moreover, load sensors configured by the grip detection-dedicated legs 43' provided at bottom right, bottom left, and top left when viewing the frame 41' in FIG. 7 from the front, and the sensor calculation unit 21, will be called, respectively, load sensors LC8, LC9, and LC10.

In the portable telephone 200 of the second embodiment, because a load sensor is built in to each of vicinities of both ends in a long side direction of the frame 41', grip position can also be detected, in addition to grip strength.

In a broad sense, "grip position" in the present specification means a position that the user of the portable apparatus (in the present embodiment, the portable telephone 200) grips the portable apparatus, and, specifically, it means, for example, a position that the user grips the casing of the portable apparatus. "Grip position" in the present embodiment is a position that the user grips the side plate 12 of the casing 10 of the portable telephone 200, that is, a position that the user applies a load to the side plate 12 of the casing 10 of the portable telephone 200.

Figure 8:
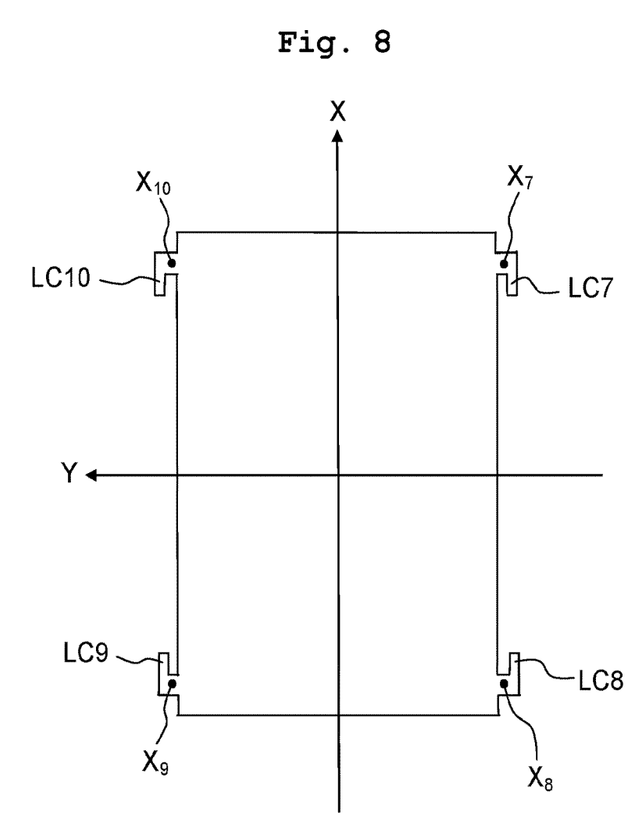
FIG. 8 is an explanatory view for explaining a method of calculating a grip strength and a grip position.

An example of a method of detecting grip strength and grip position in the present embodiment is as follows. As depicted in FIG. 8, when the frame 41' is viewed from the front, a long side direction (up-down direction) is defined as an X axis direction, and a short side direction (left-right direction) is defined as a Y axis direction. At this time, if an X coordinate of the load sensor LC7 is defined as $X_7$, an X coordinate of the load sensor LC8 is defined as $X_8$, and detection values of loads of the load sensors LC7 and LC8 are respectively defined as $W_7$ and $W_8$, then the sensor calculation unit 21 can find a magnitude $W_G$ of a grip force applied in a +Y direction in FIG. 8, that is, the grip strength, by the following equation.

[Mathematical Expression 4]

$$W_G = W_7 + W_8 \quad \text{(Equation 4)}$$

In addition, the sensor calculation unit 21 can find a position $X_G$ that the grip force is applied in the X axis direction, that is, the grip position, by the following equation.

[Mathematical Expression 5]

$$X_G = \frac{X_7 \times W_7 + X_8 \times W_8}{W_7 + W_8} \quad \text{(Equation 5)}$$

Grip strength and grip position of a grip force applied in a −Y direction can also be calculated by similar equations to (Equation 4) and (Equation 5), where an X coordinate of the load sensor LC9 is defined as $X_9$, an X coordinate of the load sensor LC10 is defined as $X_{10}$, and detection values of loads of the load sensors LC9 and LC10 are respectively defined as $W_9$ and $W_{10}$.

The portable telephone 200 of the second embodiment can display similar effects to the portable telephone 100 of the first embodiment.

Moreover, the portable telephone 200 of the second embodiment can additionally perform detection of grip position and can thereby give an original operational feeling to users, simply by adding to the portable telephone 100 of the first embodiment two grip detection-dedicated legs 43 each of which is a minute member and is capable of being disposed in dead space within the portable telephone.

The following modified modes may also be employed in the portable telephones 100 and 200 of the above-described embodiments.

The portable telephone 100 of the first embodiment includes both the touch detection-dedicated leg 42 and the grip detection-dedicated leg 43, and the portable telephone 200 of the second embodiment includes both the touch detection-dedicated leg 42' and the grip detection-dedicated leg 43', but are not limited to these. The portable telephone 100 may include only the touch detection-dedicated leg 42 or only the grip detection-dedicated leg 43, and the portable telephone 200 may include only the touch detection-dedicated leg 42' or only the grip detection-dedicated leg 43'.

The portable telephone 100 of the first embodiment includes four touch detection-dedicated legs 42, and the portable telephone 200 of the second embodiment includes four touch detection-dedicated legs 42', but are not limited to these. The number of touch detection-dedicated leg 42 included in the portable telephone 100 and the number of touch detection-dedicated leg 42' included in the portable telephone 200 are arbitrary. When only one touch detection-dedicated leg 42, 42' is included, detection of touch position cannot be performed, but detection of touch strength can be performed.

Moreover, when only two touch detection-dedicated legs 42, 42' are included, touch position in one axial direction and touch strength can be detected. If three touch detection-dedicated legs 42, 42' are included, then as long as these touch detection-dedicated legs 42, 42' are not positioned on one axis, touch position in two axial directions and touch strength can be detected.

In the portable telephone 100 of the first embodiment and the portable telephone 200 of the second embodiment, the touch detection-dedicated leg 42, 42' is provided in the long side of the frame 41, 41', but is not limited to this. The touch detection-dedicated leg 42, 42' may be provided in the short side of the frame 41, 41'.

Moreover, the touch detection-dedicated leg 42, 42' does not necessarily need to be provided in a corner section of the frame 41, 41'. A position of the touch detection-dedicated leg 42, 42' may be appropriately set such that detection of touch strength and touch position can be performed in a desired region.

Note that in the present specification, a "vicinity of four corners" of the frame 41, 41' in the case of the long side direction of the frame 41, 41' means a position whose distance to a corner section is shorter than its distance to the center in the long side direction, and preferably means a point that is at a distance of not more than (¼) D from the one end, assuming D is a distance between one end and the center in the long side direction. Moreover, a "vicinity of four corners" of the frame 41, 41' in the case of the short side direction of the frame 41, 41' means a position whose distance to a corner section is shorter than its distance to the center in the short side direction, and preferably means a point that is at a distance of not more than (¼) d from the one end, assuming d is a distance between one end and the center in the short side direction.

In the portable telephone 100 of the first embodiment and the portable telephone 200 of the second embodiment, the grip detection-dedicated leg 43, 43' is provided in the long side of the frame 41, 41', but the grip detection-dedicated leg 43, 43' may be provided in the short side of the frame 41, 41'. Moreover, position that the grip detection-dedicated leg 43, 43' is provided on the long side or on the short side of the frame 41, 41' is also arbitrary. It is also possible for the grip detection-dedicated leg 43, 43' to only be provided in one of the pair of long sides of the frame 41, 41', or to only be provided in one of the pair of short sides of the frame 41, 41'.

In the touch detection-dedicated leg 42 included in the detection member 40 of the portable telephone 100 of the first embodiment and the touch detection-dedicated leg 42' included in the detection member 40' of the portable telephone 200 of the second embodiment, the first plate 421 and the second plate 422 were orthogonal, but are not limited to this. The first plate 421 and the second plate 422 may intersect having a certain angle.

In the touch detection-dedicated leg 42 included in the detection member 40 of the portable telephone 100 of the first embodiment and the touch detection-dedicated leg 42' included in the detection member 40' of the portable telephone 200 of the second embodiment, the strain gage G is attached to both surfaces of the second plate 422, but is not limited to this. It is possible for the strain gage G to only be attached to one surface of the second plate 422. Alternatively, for example, it may be configured such that by a full bridge configuration using four strain gages G, shearing strain occurring in the second plate 422 can be detected with about four times a sensitivity compared to when one strain gage is used.

Moreover, the strain gage G may be attached to both surfaces or one surface of the first plate 421, not the second plate 422. Because a bending strain occurs also in the first plate 421 when a load is applied to the frame 41 or frame 41', a load sensor can be constructed by a strain gage G attached to the first plate 421 and the sensor calculation unit 21.

It is possible for the touch detection-dedicated leg 42 included in the detection member 40 of the portable telephone 100 of the first embodiment and the touch detection-dedicated leg 42' included in the detection member 40' of the portable telephone 200 of the second embodiment to only include the first plate 421 with the strain gage G, and not include the second plate 422 and the third plate 423. In this case, the tip end of the first plate 421 may be attached to the inner surface side of the side plate 12 of the casing 10.

Because a bending strain occurs in the first plate 421 when a load is applied to the frame 41, 41' even in such a touch detection-dedicated leg 42, 42', a load sensor can be constructed in conjunction with the sensor calculation unit 21.

In the touch detection-dedicated leg section 42 included in the detection member 40 of the portable telephone 100 of the first embodiment and the touch detection-dedicated leg section 42' included in the detection member 40' of the portable telephone 200 of the second embodiment, shapes of the first plate 421, the second plate 422, and the third plate 423 are arbitrary. For example, the first plate 421 may have the likes of a rectangular shape, not a substantially square shape, and the second plate 422 may have the likes of a substantially square shape, not a rectangular shape. The third plate 423 may have a flat plate shape, for example.

The touch detection-dedicated leg 42 and the grip detection-dedicated leg 43 included in the detection member 40 of the portable telephone 100 of the first embodiment and the touch detection-dedicated leg 42' and the grip detection-dedicated leg 43' included in the detection member 40' of the portable telephone 200 of the second embodiment are each configured by a plurality of plate-like members, but are not limited to this. As an example, the first plate 421, 431 and the third plate 423, 433 may have a circular columnar shape or a prismatic columnar shape. Moreover, the second plate 422, 432 is also not limited to being plate-like provided it has a shape enabling the strain gage G to be attached, and may be configured having a circular columnar shape or a prismatic columnar shape, for example.

In the grip detection-dedicated leg 43 included in the detection member 40 of the portable telephone 100 of the first embodiment and the grip detection-dedicated leg 43' included in the detection member 40' of the portable telephone 200 of the second embodiment, the first plate 431 and the second plate 432 are orthogonal, but are not limited to this. The first plate 431 and the second plate 432 may intersect having a certain angle.

In the grip detection-dedicated leg 43 included in the detection member 40 of the portable telephone 100 of the first embodiment and the grip detection-dedicated leg 43' included in the detection member 40' of the portable telephone 200 of the second embodiment, the strain gage G was attached to both surfaces of the second plate 432, but is not limited to this. It is possible for the strain gage G to only be attached to one surface of the second plate 432. Alternatively, for example, it may be configured such that by a full bridge configuration using four strain gages G, bending strain occurring in the second plate 432 can be detected with about four times a sensitivity compared to when one strain gage is used.

Moreover, the strain gage G may be attached to both surfaces or one surface of the first plate 431, not the second plate 432. Because a shearing strain occurs also in the first plate 431 when a load is applied to the side plate 12 of the casing 10, a load sensor can be constructed by a strain gage G attached to the first plate 431 and the sensor calculation unit 21.

In the grip detection-dedicated leg 43 included in the detection member 40 of the portable telephone 100 of the first embodiment and the grip detection-dedicated leg 43' included in the detection member 40' of the portable telephone 200 of the second embodiment, shapes of the first plate 431, the second plate 432, and the third plate 433 are arbitrary. For example, the first plate 431 may have the likes of a rectangular shape, not a substantially square shape, and the second plate 432 may have the likes of a substantially square shape, not a rectangular shape. The third plate 433 may have a flat plate shape, for example.

Neither the frame 41 included in the detection member 40 of the portable telephone 100 of the first embodiment nor the frame 41' included in the detection member 40' of the portable telephone 200 of the second embodiment is limited to being a rectangular plate. The frame 41, 41' may be of any shape such as a square or other polygon, a circle, or an ellipse.

The portable telephone 100 of the first embodiment and the portable telephone 200 of the second embodiment may further include a touch panel of another system, such as a resistance film system or an electrostatic capacity system.

The first embodiment and the second embodiment have been described citing a portable telephone as an example of the portable apparatus, but the portable apparatus including the sensor unit SU of the above-described embodiments is not limited to a portable telephone. For example, the sensor unit SU of the above-described embodiments may also be employed in the likes of a portable game machine, a portable music players, a notebook personal computer, or a tablet.

The portable apparatus of the above embodiments make it possible for a pressing force applied by a user to be detected by a simple configuration.

As long as features of the present invention are maintained, the present invention is not limited to the above-described embodiments, and other forms considered to be in a range of technical ideas of the present invention may also be included in a range of the present invention.

For example, the likes of the above-described detection member (that is, a frame mechanism/structure configured by the frame and at least one of the touch detection-dedicated leg and grip detection-dedicated leg) or sensor unit configured by this detection member and the sensor calculation unit, are also included in modes of the present disclosure.

What is claimed is:

1. A portable apparatus capable of detecting a grip strength with which a user grips the portable apparatus, the portable apparatus comprising:
    a rectangular frame on which a display panel unit is to be mounted;
    a first grip detection-dedicated leg extending from a long side of the frame;
    a first strain gage attached to the first grip detection-dedicated leg; and
    a calculator that finds the grip strength based on an output of the first strain gage, the grip strength being a strength applied to the portable apparatus in a direction of a short side of the frame by the user gripping the portable apparatus.

2. The portable apparatus according to claim 1, further comprising a casing that has a back surface and a side surface and that houses the grip detection-dedicated leg,
    wherein the grip detection-dedicated leg is in contact with the side surface on an inside of the casing.

3. The portable apparatus according to claim 1, further comprising:
    a second grip detection-dedicated leg extending from the long side of the frame; and
    a second strain gage attached to the second grip detection-dedicated leg,
    wherein the calculation unit detects a grip position where the user grips the casing, based on outputs of the first strain gage and the second strain gage.

4. The portable apparatus according to claim 1, wherein the rectangular frame and the first grip detection-dedicated leg are formed integrally and are formed of an identical material.

* * * * *